United States Patent
Yen et al.

[11] Patent Number: 6,151,025
[45] Date of Patent: Nov. 21, 2000

[54] METHOD AND APPARATUS FOR COMPLEXITY REDUCTION ON TWO-DIMENSIONAL CONVOLUTIONS FOR IMAGE PROCESSING

[75] Inventors: Jonathan Yen, San Jose, Calif.; Luca Chiarabini, Barcelona, Spain

[73] Assignee: Hewlett-Packard Company, Palo Alto, Calif.

[21] Appl. No.: 08/852,620

[22] Filed: May 7, 1997

[51] Int. Cl.$^7$ .................................................. G06T 3/20
[52] U.S. Cl. .................... 345/418; 345/127; 345/129; 345/137
[58] Field of Search .................... 345/127, 129, 345/137, 418

[56] References Cited

U.S. PATENT DOCUMENTS

| | | | |
|---|---|---|---|
| 4,528,693 | 7/1985 | Pearson et al. | 345/127 |
| 4,725,892 | 2/1988 | Suzuki et al. | 345/129 |
| 4,843,380 | 6/1989 | Oakley et al. | 345/129 |
| 5,410,616 | 4/1995 | Kidd | 345/127 |

FOREIGN PATENT DOCUMENTS 0548917   6/1993   European Pat. Off. ....... H03H 17/06

OTHER PUBLICATIONS

Anonymous; "Pipelined Convolver for Two Dimensional Images"; Jul., 1971; IBM Technical Disclosure Bulletin, vol. 14, No. 2, pp. 475–476.

*Primary Examiner*—Mark R. Powell
*Assistant Examiner*—Kimbinh T. Nguyen

[57] ABSTRACT

A method and apparatus are provided for reducing the complexity of two-dimensional linear convolutions. All possible pixel patterns for a row of a pixel array are determined and multiplied by a corresponding row in a convolution kernel matrix. The partial convolution results are stored in a lookup table. In a processing step, each row of an input pixel window is compared to the possible pixel rows. Partial results associated with a matching pixel row are accessed from the lookup table. In one preferred embodiment of the invention, each row of an input pixel window is stored in a line cache. In another, equally preferred embodiment, a hash function is optionally used to derive an index value for each possible pixel row. The partial result associated with an equal index value is accessed. In another, equally preferred embodiment, double buffer stores two consecutive input pixel windows for processing. After each row of the first buffer is processed, the double buffer is shifted by one pixel. After the entire contents of the second buffer have been shifted into the first buffer, the next input pixel window is moved into the second buffer. Thus, the invention requires only one main memory access for each input pixel window. The partial convolution results are preferably calculated in floating point arithmetic and converted to a fixed point precision before they are stored as table entries.

22 Claims, 6 Drawing Sheets

SAMPLE CONVOLUTION KERNELS

Convolution kernels for scaling by a factor of 3 with a bi-cubic uniform polynomial B-spline tensor product surface, $s(u,v)$. $K^{u_0,v_0}$ is the kernel for sampling $s(u,v)$.

$$K^{0,0} = \frac{1}{36} \cdot \begin{bmatrix} 1 & 4 & 1 & 0 \\ 4 & 16 & 4 & 0 \\ 1 & 4 & 1 & 0 \\ 0 & 0 & 0 & 0 \end{bmatrix}$$

$$K^{0,\frac{1}{3}} = \frac{1}{972} \cdot \begin{bmatrix} 8 & 93 & 60 & 1 \\ 32 & 372 & 240 & 4 \\ 8 & 93 & 60 & 1 \\ 0 & 0 & 0 & 0 \end{bmatrix}$$

$$K^{0,\frac{2}{3}} = \frac{1}{972} \cdot \begin{bmatrix} 1 & 60 & 93 & 8 \\ 4 & 240 & 372 & 32 \\ 1 & 60 & 93 & 8 \\ 0 & 0 & 0 & 0 \end{bmatrix}$$

$$K^{\frac{1}{3},0} = \frac{1}{972} \cdot \begin{bmatrix} 8 & 32 & 8 & 0 \\ 93 & 372 & 93 & 0 \\ 60 & 240 & 60 & 0 \\ 1 & 4 & 1 & 0 \end{bmatrix}$$

$$K^{\frac{1}{3},\frac{1}{3}} = \frac{1}{26244} \cdot \begin{bmatrix} 64 & 744 & 480 & 8 \\ 744 & 8649 & 5580 & 93 \\ 480 & 5580 & 3600 & 60 \\ 8 & 93 & 60 & 1 \end{bmatrix}$$

$$K^{\frac{1}{3},\frac{2}{3}} = \frac{1}{26244} \cdot \begin{bmatrix} 8 & 480 & 74 & 64 \\ 93 & 5580 & 8649 & 744 \\ 60 & 3600 & 5580 & 480 \\ 1 & 60 & 93 & 8 \end{bmatrix}$$

$$K^{\frac{2}{3},0} = \frac{1}{972} \cdot \begin{bmatrix} 1 & 4 & 1 & 0 \\ 60 & 240 & 60 & 0 \\ 93 & 372 & 93 & 0 \\ 8 & 32 & 8 & 0 \end{bmatrix}$$

$$K^{\frac{2}{3},\frac{1}{3}} = \frac{1}{26244} \cdot \begin{bmatrix} 8 & 93 & 60 & 1 \\ 480 & 5580 & 3600 & 60 \\ 744 & 8649 & 5580 & 93 \\ 64 & 744 & 480 & 8 \end{bmatrix}$$

$$K^{\frac{2}{3},\frac{2}{3}} = \frac{1}{26244} \cdot \begin{bmatrix} 1 & 60 & 93 & 8 \\ 60 & 3600 & 5580 & 480 \\ 93 & 5580 & 8649 & 744 \\ 8 & 480 & 74 & 64 \end{bmatrix}$$

ABC
A Test Image of Times Font, Size 20 Point
FIG. 7a
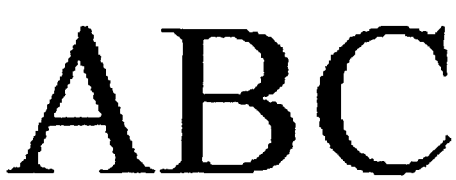
Scaled 4X by Pixel Replication
FIG. 7b
Scaled 4X by Bi-linear Interpolation
FIG. 7c
Scaled 4X Bi-septimal B-spline Interpolation
FIG. 7d

METHOD AND APPARATUS FOR COMPLEXITY REDUCTION ON TWO-DIMENSIONAL CONVOLUTIONS FOR IMAGE PROCESSING

BACKGROUND OF THE INVENTION

1. Technical Field

The invention relates to processing images. More particularly, the invention relates to reducing the computational cost of a two-dimensional linear convolution applied in image processing techniques such as scaling, smoothing or sharpening.

2. Description of the Prior Art

When scaling a binary image, it is necessary to resolve any discrepancy between the input resolution and the output resolution. For example, in facsimile imaging the original images are transmitted at a standard resolution, typically 203 dots per inch ("dpi") in the row direction and 98 dpi in the column direction. The images are then printed at the printer resolution, e.g. 300 dpi in both the row and column directions. Another example of binary imaging involves font scaling. For example, when a 12 point font at 300 dpi is to be used as a 24 point font and printed on a 600 dpi printer, the original image must be scaled by a factor of four.

One approach to image scaling is to apply piecewise polynomial interpolation such as B-splines, as proposed in R. V. Klassen, R. H. Bartels, *Using B-splines for Re-Sizing Images*, University of Waterloo, Department of Computer Science, Technical Report, 1986. However, such approach has not proven satisfactory.

There are at least two barriers that prevent practical application of the Klassen and Bartels interpolation technique for image scaling in the industry. The first barrier concerns the quality of the result. Under some conditions, interpolation schemes give rise to a quantization errors, such that the image stroke width is not preserved after image scaling. For example, a quantization error problem embedded in all piecewise polynomial interpolants for scaling was reported in I. E. Abdou and K. Y. Wong, *Analysis of Linear Interpolation Schemes for Bi-Level Image Applications*, IBM J. Res. Develop., V. 26, No. 6, pp. 667–680, November, 1982.

A novel solution to this first barrier, the "quanfization error problem," was presented in Yen, Binary Image Scaling by Piecewise Polynomial Interpolation, U.S. Pat. No. 5,627,953, issued May 6, 1997 (U.S. patent application Ser. No. 08/286,561, filed Aug. 5, 1994), incorporated by reference as a part of this application. The fundamental idea of the Yen scaling algorithm is to treat the original image as three-dimensional data. The horizontal and vertical dimensions of the image are represented by the variables X and Y, respectively, and the intensity of the image is represented by the variable Z. The three dimensional data is then fitted to a piecewise polynomial (spline) surface. Re-sampling on this fitted surface produces the scaled image in gray scale. A final step of thresholding quantizes the gray scale into a binary result The second barrier to the practical application of the interpolation technique is the computational complexity required, particularly for large scaling factors with high degree interpolants. It was determined by the inventors herein that the Yen spline algorithm produces high quality result in scaling binary text, especially for the large scaling factors encountered in printing on large format printers. However, the computations are enormously complex.

In Binary Image Scaling by Piecewise Polynomial Interpolation, Yen uses a convolution step in an interpolation technique for image scaling. Two dimensional linear convolutions are commonly used in digital image processing for image smoothing, sharpening and scaling. (See, for example, Jain, "Fundamentals of Digital Image Processing," Prentice Hall, 1989). The computational complexity of this type of scaling method is determined by the image size, the scaling factors, $N_h$ in horizontal direction and $N_v$ in vertical direction, and the degree of the interpolant, $K_h$ in horizontal direction and $K_v$ in vertical direction. The convolution weights require $N_h \cdot N_v$ weight tables, each weight table having $K_h \cdot K_v$ entries.

For example, FIG. 1 illustrates scaling an image by a factor of three in both horizontal and vertical directions by a bi-cubic (order four) B-spline interpolant. The four by four input pixel window's 14 dimensions are determined by the order of the interpolant.

An input pixel 10 is surrounded by neighboring pixels 12. When scaled by a factor of three in both horizontal and vertical directions, each input pixel 10 is scaled into an array 20 of nine output pixels. The number of output pixels (nine) represents the product of the horizontal (three) and vertical (three) scaling factors.

Each output pixel has an associated weight function. This weight function is dependent both on the degree of the interpolant and on the scaling factor. In Binary Image Scaling by Piecewise Polynomial Interpolation, Yen implements the weight function as convolution kernels. FIG. 2 is a table of convolution kernels for scaling by a factor of three with a bi-cubic uniform polynomial B-spline tensor product surface. The derivation of these convolution kernels is in accordance with the teachings of Yen, cited above. Each of the nine convolution kernels is a matrix having sixteen entries. For example, the matrix 22 is the convolution kernel representing the weight function for output pixel 24.

The convolution step to calculate output pixel 24 is the entry-by-entry multiplication of a matrix 26 representing the input pixel window with the convolution kernel matrix, ie 22, representing the appropriate weight function for each pixel in the window. In FIG. 1, the matrix 26 represents each shaded entry 18 of the input pixel window by the value one and each light entry 16 by the value zero. The multiplication of the input pixel window matrix 26 with the weight function matrix 22 produces a gray scale value of the resulting output pixel. To achieve the final binary result representing the output pixel, a thresholding step is used.

The Yen convolution kernels exhibit subtle mathematical properties which are related to the complexity of the interpolation process. For example, the value zero entries 28 in convolution kernel matrix 22 indicate that the pixels in the bottom row 30 and the right most column 32 of the input pixel window are not used as part of the input pixel weighting process to derive output pixel 24. This is called the locality property.

Various symmetries are observed both within and across the table of sample convolution kernels. Such symmetries include kernels having symmetric rows or columns of repeating vectors in transposes, reflects or permutations.

Each convolution kernel matrix in FIG. 2 has one entry having a dominating weight. By comparison, the corner entries of the kernels usually have much smaller, insignificant weights. Therefore, some of the input pixels that have smaller weights can be ignored in the convolution step without significantly affecting the output result. This is called the dominancy property.

In one extreme approach, each output pixel is processed by multiplying each of the $K_h$ by $K_v$ input pixels, entry by entry, with the weight table. The $K_h*K_v$ products are added, and a thresholding step is performed on the sum. The total computational cost of this approach is $K_h*K_v$ multiplications plus $K_h*K_v-1$ additions and 1 comparison, all in double precision floating point arithmetic, for each output pixel.

For example, scaling a letter-sized, 300 dpi (dot-per-inch) image by 4 to a 600 dpi output, is effectively equivalent to scaling the image by 8 times in both directions by a bi-septimal (degree 7, order 8) B-spline interpolant. The total computation for this scaling operation is approximately 65 Giga Floating Point Operations. Using a 40 MFLOPS (Million Floating Point Operations Per Second) processor, this scaling process requires approximately 30 minutes of CPU time.

In another extreme approach, a table look-up scheme is used to speed up the convolution step. Every possible resulting product of the multiplication of each of the input pixels by the weight function is pre-calculated and stored in a table. The thresholding value is also pre-determined. The scaling process is performed by matching patterns of the input pixels and producing output pixels by table lookup.

Using a table lookup scheme, the time complexity is linear in relation to the output image size. The space complexity is related exponentially to the degree of the interpolant. If the output is binary, the lookup table size is $2^{(K_h \cdot K_v)} \cdot (N_h \cdot N_v)$ bits. Some advantageous properties of B-splines, such as locality, symmetry and dominancy, can be utilized to reduce the table size. For example, when a table lookup scheme to scale by 3 with a bi-cubic B-spline interpolant, the lookup table size is reduced from 72 KB using the above-described convolution technique, to approximately 7 KB.

However, when using a higher order interpolant and larger scaling factors, the lookup table size increases dramatically to an impractical size. In the example discussed above, scaling an image 8 times in both directions by a bi-septimal B-spline interpolant, $2^{67}$ bytes are required.

It would therefore be an advantage to substantially reduce computational cost of image processing techniques as compared to the prior art. It would be yet another advantage to balance the time and space complexities to provide a practical application.

SUMMARY OF THE INVENTION

The invention provides a method and system for reducing the complexity of two dimensional linear convolutions. An input pixel window is structured as a set of rows. In a preferred embodiment of the invention, the input image data is binary, with each line coded with one bit per pixel. However, the invention may also be applied to other types of data coded with more than one bit per pixel, including two-bit, four-bit and eight-bit grey scale.

All possible patterns of input pixels in a row of a pixel array are determined and multiplied by a corresponding row in the convolution kernel matrix representing the weight function. These partial results are stored in a lookup table. In the processing step, each row of an input pixel window is mapped to the possible patterns of input pixels. The partial results associated with the matching possible pattern are then accessed from the lookup table.

In one preferred embodiment of the invention, each row of an input pixel window is stored in a line cache. In another, equally preferred embodiment, a hash function translates the bits from the line cache into their equivalent decimal value. This decimal value is interpreted as the index to a lookup table. The partial result stored in the indexed entry of the lookup table is then accessed.

In yet another, equally preferred embodiment, two line caches (a double buffer) store bits from two consecutive input pixel windows, each structured as a set of rows. After each row of the first buffer has been processed, the contents in the first and second buffers are shifted one pixel to the left to continue processing. After all of the contents of the second buffer have been shifted into the first buffer, the next input pixel window is loaded into the second buffer. Thus, the invention requires only one main memory access for processing all the pixels in each input pixel window.

In the preferred embodiment of the invention, the partial convolution results are calculated in floating point arithmetic and converted to a fixed point precision before they are stored as table entries.

BRIEF DESCRIPTION OF THE DRAWINGS

FIG. 2 is a table of convolution kernels for scaling by a factor of 3 with a bi-cubic uniform polynomial B-spline tensor product surface;

FIG. 7a is a test image of Times font, size 20 point;

FIG. 7b is a test image of Times font, size 20 point, scaled 4 times using pixel replication;

FIG. 7c is a test image of Times font, size 20 point, scaled 4 times using bi-linear interpolation; and FIG. 7d is a test image of Times font, size 20 point, scaled 4 times using bi-septimal B-spline interpolation, according to the invention.

DETAILED DESCRIPTION OF THE INVENTION

The invention provides a method and system for reducing the complexity of a two-dimensional linear convolution. Convolutions are applied in various image processing techniques, including image smoothing, sharpening, and scaling. The prior art convolution scheme discussed above is an extreme case in terms of time complexity. The prior art table lookup scheme discussed above is an extreme case in terms of space complexity. By contrast, the invention uses both convolution and a lookup table, while balancing both time and space complexities in comparison to the prior art approaches.

The invention can be applied to any type of input data, including binary and grey scale. The invention is used to advantage when scaling by variable scaling factors and when having a limited memory space. In this situation, insufficient space may be available to store the large convolution tables needed for each scaling factor.

In the prior art convolution scheme, discussed above, the pixels in the input pixel window 26 are multiplied one at a time, entry-by-entry, with the corresponding convolution kernel matrix 22. Afterwards, the input pixel window is shifted one pixel to its right and the convolution process is repeated.

In the invention, the size of the input pixel window is $K_h$ by $K_v$. Thus, there are $2^{(K_h \cdot K_v)}$ possible combinations of pixel values in an input binary pixel window. Each input pixel is scaled into an $N_h$ by $N_v$ output pixel array.

Each output pixel is computed as a weighted average of the neighboring pixels of the corresponding input pixel. Thus, each output pixel has an associated weight function that applies to the pixels in a $K_h$ by $K_v$ input pixel window whose dimensions are the order (degree plus one) of the polynomial interpolant. The higher the order of the interpolant, the bigger the input binary pixel window.

Figure 1:
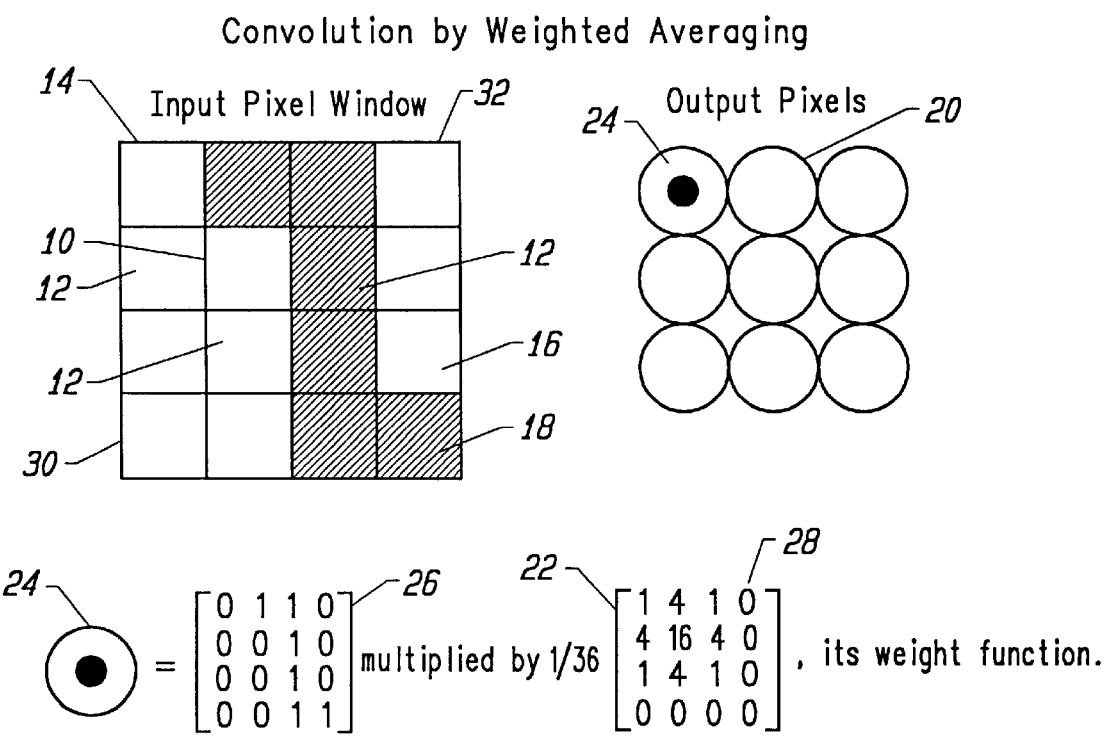
FIG. 1 illustrates scaling an image by a factor of three in both horizontal and vertical directions by a bi-cubic B-spline interpolant, according to the prior art.
Figure 3:
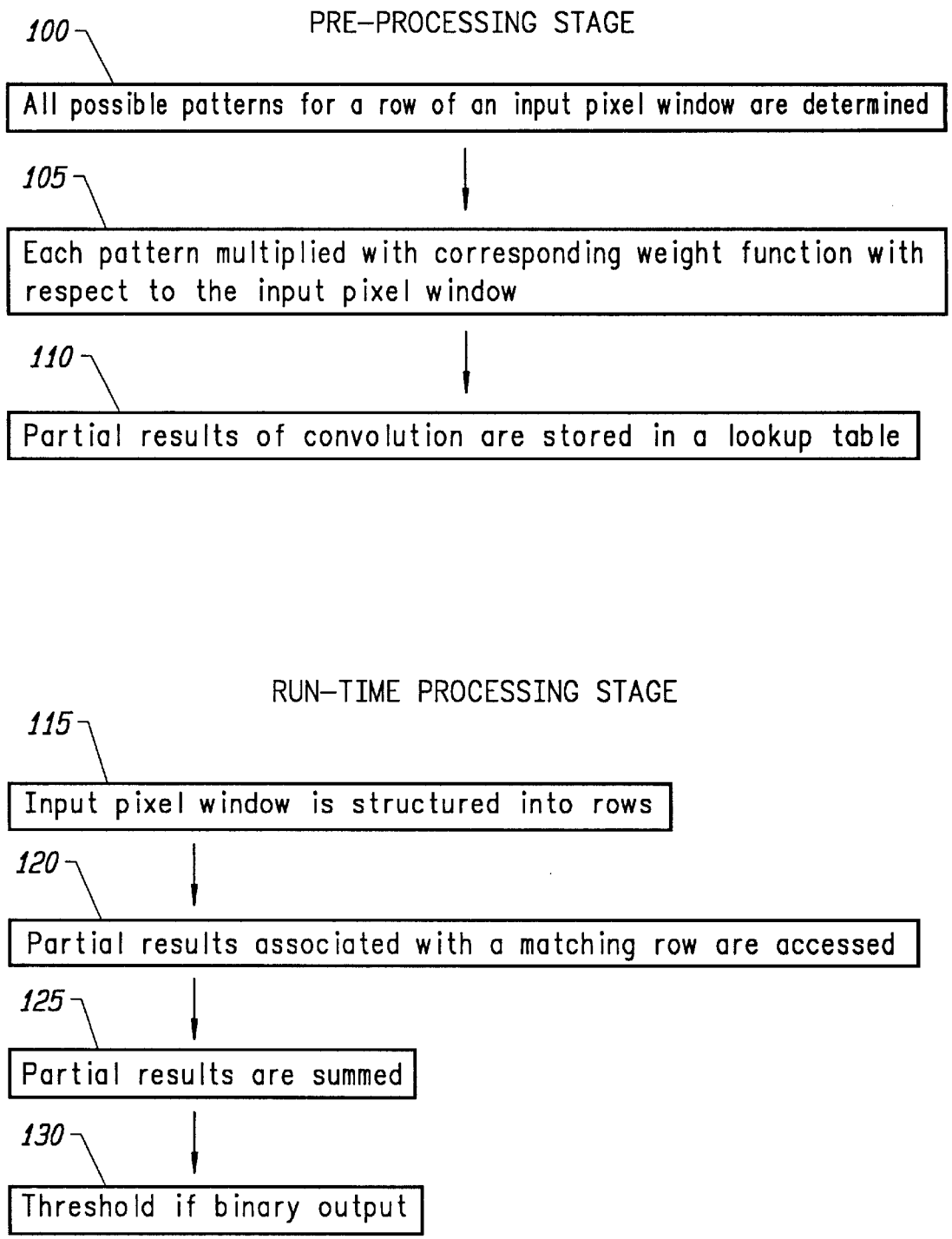
FIG. 3 is a flow chart of the method for reducing the complexity of a two-dimensional linear convolution, according to the invention.

FIG. 3 is a flow chart of the method for reducing the complexity of a two-dimensional linear convolution, according to the invention. In the pre-processing stage, all possible patterns for a row of an input pixel window are determined (100). Each pattern is multiplied (105) with a corresponding row of the convolution kernel matrix. The products of this multiplication are stored (110) in a lookup table as partial results.

During the run-time processing stage, an input pixel window is structured into rows (115). The partial results associated with a matching row are then accessed (120) from the lookup table. All partial results for the input pixel window are summed (125) as final results and a thresholding step is performed if the output is binary. (130)

Figure 4:
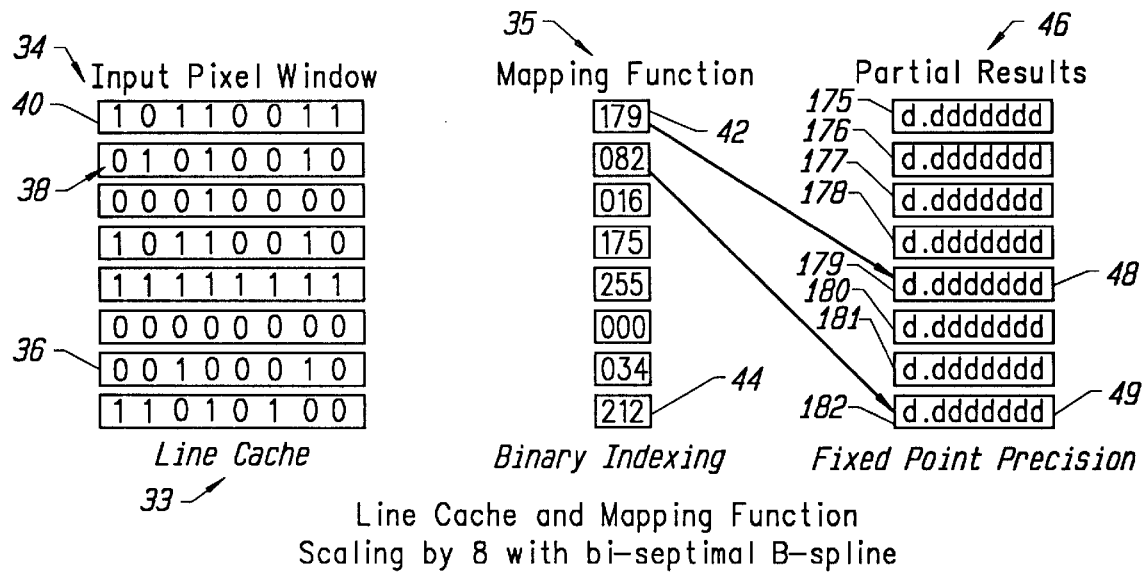
FIG. 4 is a chart showing a line cache and a hashing function, according to the invention.

FIG. 4 is a chart showing a line cache 33 and a hashing function 35, according to one preferred embodiment of the invention. The exemplary input image has a standard binary image format. The input binary pixel window 34 is structured as a set of rows 36, each row coded with one bit 38 per pixel and stored in a separate line of the line cache 33. Consequently, each $K_h$ by $K_v$ input binary pixel window can be treated as $K_v$ rows of $K_h$ bits (1 bit per pixel.) In the example of the bi-septimal B-spline interpolant shown in FIG. 3, each input binary pixel window corresponds to 8 rows of 8 bits each.

An index 44 is used to look up the stored results in the lookup table 46. In the example, the indexing scheme is a hash function that converts the binary data to its decimal value. In other embodiments of the invention, this hash function converts different data types, into a decimal equivalent.

This is distinguished from the prior art approach of storing all possible results for the convolution of an entire input pixel window. In the prior art approach, pattern matching is then used to compare an entire input pixel window, and to look up the stored convolution results for the desired image processing operation.

Thus, in the invention, lookup tables containing partial convolution results are generated in advance. However, the final convolution results are calculated during execution of the image processing (in the example, image scaling). The final convolution results are calculated using a line cache and an indexing scheme to collect the partial results. The lookup tables are generated only when necessary, for example, for each print job, or per page.

In the example shown in FIG. 4, all possible patterns of an 8 pixel (bit) row are multiplied by the corresponding row in an 8-by-8 convolution kernel matrix. The partial results for each row are stored in a lookup table 46 for later use during run-time.

For the first row 40 of the input binary pixel window, $K_h$ equals 8. This first row contains the binary number "10110011". The hash function translates the binary bits received from the first row of the input binary pixel window into their decimal equivalent "179" 42. This value "179" is used to look up the corresponding pre-calculated contents in the corresponding "179" entry 48 of the partial results lookup table 46 for the first row. The partial result for the second row of the input binary pixel window can be accessed from entry "082" 49 of the partial result table for the second row. Finally, all of the partial results are summed as the final convolution result.

In the preferred embodiment of the invention, partial convolution results are calculated in floating point arithmetic and converted to a fixed point precision before they are stored as table entries. For example, in FIG. 4, the precalculated value is stored as an 8 bit fixed point value.

Figure 5:
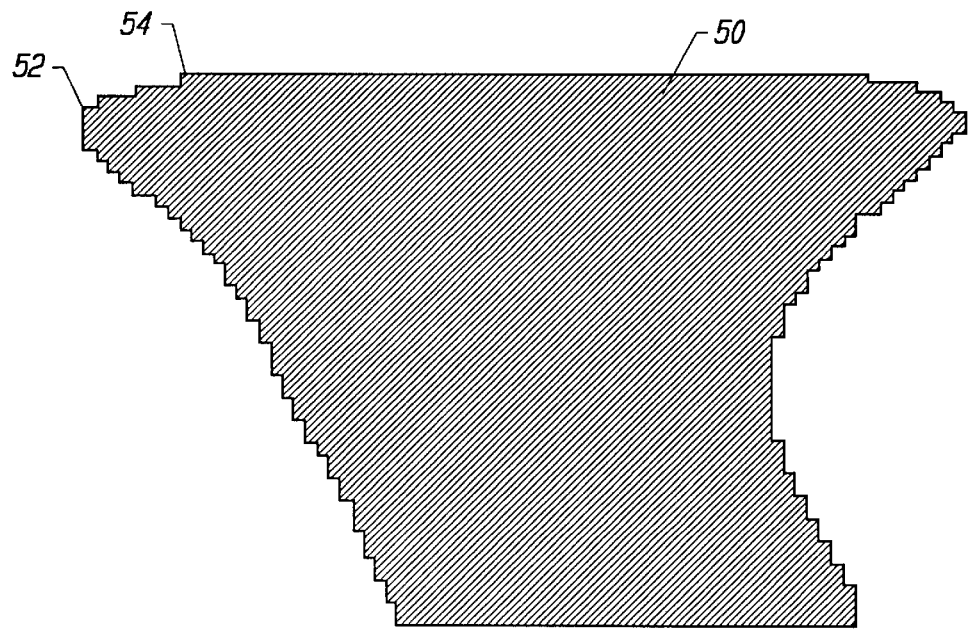
FIG. 5 is an image illustrating the discrepancy between floating point and fixed point 8-bit representations for scaling by four with a bi-septimal B-spline, according to the invention.

By using 8-bit fixed point representation, the memory requirement for the invention is reduced to one-eighth the memory required using floating point representation. While this conversion causes a minor loss of precision, the total discrepancy affects an insignificant number of output pixels. FIG. 5 is an image 50 illustrating the discrepancy between floating point and fixed point 8-bit representations for scaling by four with a bi-septimal B-spline.

In FIG. 5, the grey dots 54 are generated by fixed point precision but are absent in floating point precision. The dark dots 52 are found in floating point precision but are missed in fixed point precision. Of the total 128,000 pixels in the image, 66 are grey and 36 are dark. Thus, the total number of pixels in discrepancy is less than 0.08% of the total pixels in the image. Both floating point and fixed point representations are approximations.

Figure 6:
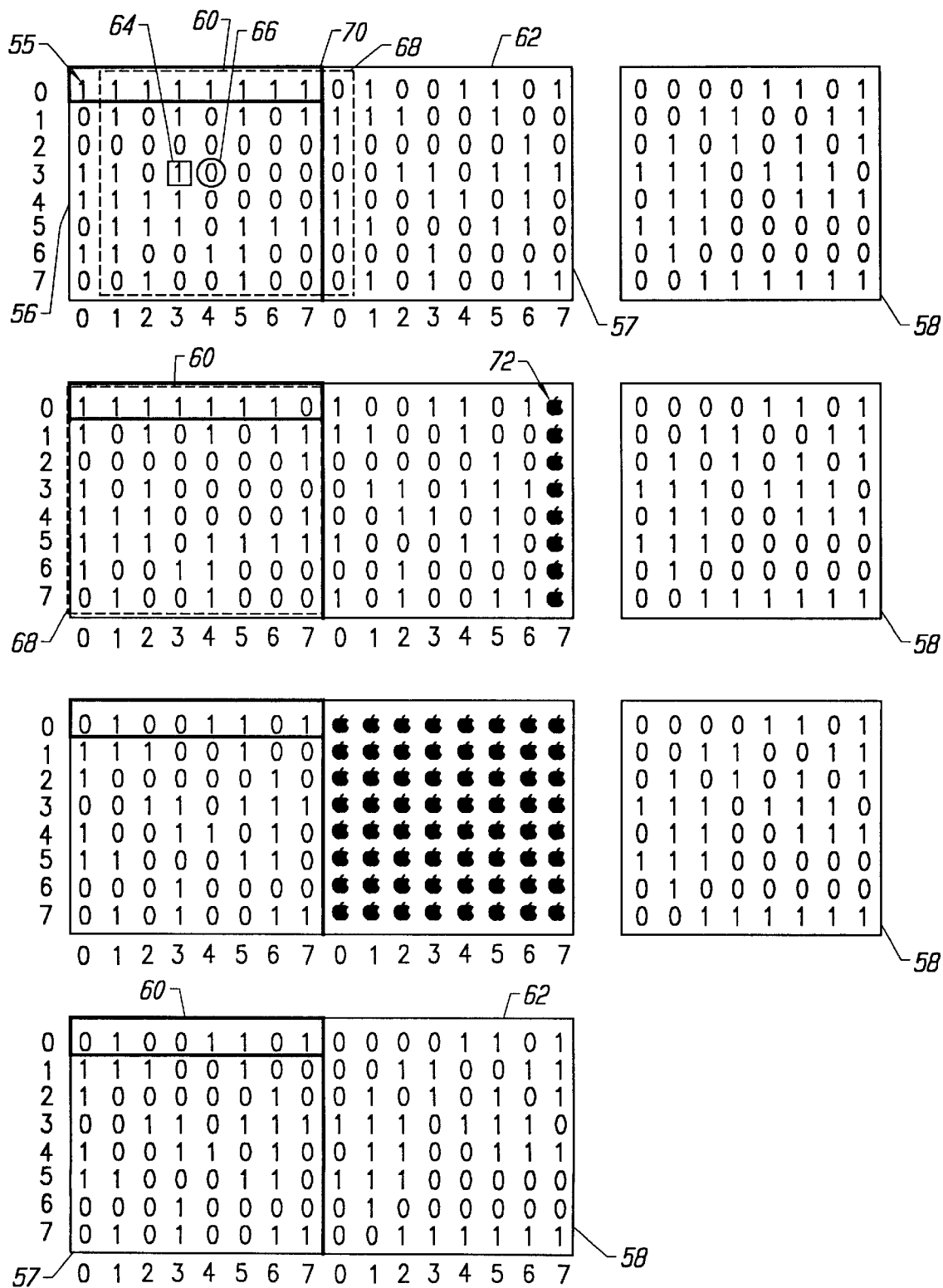
FIG. 6 is a diagram illustrating double buffering for optimizing memory access, according to the invention.

In the preferred embodiment of the invention, two line caches (a double buffer) are used to eliminate excessive memory access and therefore decrease memory access time. FIG. 6 is a diagram illustrating double buffering for optimizng memory access, according to the invention. An output pixel is calculated by the sum of each surrounding pixel in the input pixel window multiplied with its appropriate convolution kernel. In the example, each input binary pixel window corresponds to 8 rows of 8 bits each.

For example, input pixel 64 is surrounded by input pixel window 56. Input pixel 66 is offset by one pixel from input pixel 64. Thus, the input pixel window 68 surrounding input pixel 66 is also offset by one pixel in each row from input pixel window 56.

The invention takes advantage of this relationship by using a double buffer 70. To commence processing, two consecutive input pixel windows 56, 57 are accessed from memory and stored in the first and second buffers 60, 62, respectively. Each input pixel window is structured as a set of rows 55.

In the example, the first row, row "0" of input pixel window 56 is processed. Rows "1" through "7" are also processed until input pixel 64 has been completely processed. These rows may be processed consecutively or in any other desired order. The input pixels in the first column, column "0" are then shifted out of the first buffer. The input pixels from the first column, column "0' "are shifted from the second buffer into column "7" of the first buffer. The last column of the second buffer 62, column "7'" is filled with space holders 72.

The first buffer 60 now contains the input pixel window 68 for processing input pixel 66. These processing steps repeat while the input window is shifted sequentially by one pixel at the conclusion of each processing step.

When all of the input pixels in the first buffer have been processed, the second buffer is completely filled with space holders 72. The input pixels 57 from the second buffer 62 now fill the first buffer 60. The next input pixel window 58 is accessed from memory and stored in the second buffer. The processing steps repeat until completion. Thus, instead of accessing the main memory for each individual input pixel and accessing 1 byte per input pixel (8 accesses per 8 input pixels), the invention requires 1 access and 7 shifts per 8 input pixels.

According to the invention, the computational time for each output pixel is related linearly to the degree of the spline interpolant. The total computational cost for each output pixel is therefore $K_v-1$ (or fewer) additions per output pixel to obtain a grey level image. One comparison per output pixel is needed for thresholding to get a binary output. The size of the lookup table 46 is $(K_v \cdot 2^{Kh}) \cdot (N_h \cdot N_v)$ bytes. By contrast, the prior art convolution scheme described above requires $K_h \cdot K_v$ multiplications, $K_h \cdot K_v-1$ additions and 1 comparison.

For example, using two line caches and a hash function index with 8-bit fixed point precision, approximately 4.1 Giga instructions are needed to scale an approximately 500 by 300 pixel image by a factor of eight and with a bi-septimal B-spline interpolation,. By contrast, the timing complexity required to scale the same pixel image using the prior art convolution scheme is approximately 65 Giga floating point operations.

In the invention, the space complexity remains exponential to the degree of the interpolant, but is enormously reduced in comparison to that of the prior art. For example, using fixed point 8-bit precision, the lookup table size is $(K_v \cdot 2^{Kh}) \cdot (N_h \cdot N_v)$ bytes. For scaling by a factor of eight with a bi-septimal B-spline interpolation, the lookup table size is $2^{17}$ bytes (128 Kb), or 16 KB.

By contrast, the prior art lookup table size is $2^{(K_h \cdot K_v)} \cdot (N_h \cdot N_v)$ bytes. For scaling by a factor of eight with a bi-septimal B-spline interpolation, the lookup table size is $2^{67}$ bytes. Thus, the reduction in space complexity of the invention as compared to that of the prior art table lookup scheme can approach many orders of magnitude.

In one example of the invention, an image was scaled by 8 in both horizontal and vertical directions. The scaling was performed on an HP workstation 735 computer, operating at 99 MH with a floating co-processor, 124 MIPS, 40 MFLOPS. A bi-septimal tensor product B-spline was used as the interpolant. A double buffer line cache, and a hash function index were used. The partial results were stored in fixed point 8-bit precision. With an image size of 542×300 pixels, the CPU time for lookup table generation was 110 ms. The memory used for the tables was 128 KB, and the total CPU time for output generation was 6780 ms.

FIGS. 7a–7d show a test case using input test images in Times font of sizes from 8 points through 20 points. Each test image has a total of 2315 by 1023 pixels. The test images shown in FIGS. 7b–7d are all scaled 4 times in both horizontal and vertical orientation using an HP 9000/730 workstation. FIG. 7a is a test image 74 of Times font, size 20 point. FIGS. 7b–7c are scaled test images of Times font, size 20 point, according to the prior art. The test image 76 shown in FIG. 7b is scaled using pixel replication. FIG. 7c is a test image 78 of Times font, size 20 point, scaled 4 times using bi-linear interpolation as taught in Yen, Binary Image Scaling by Piecewise Polynomial Interpolation, discussed above.

FIG. 7d is a test image 80 of Times font, size 20 point, scaled 4 times using bi-septimal B-spline interpolation, according to the invention. The test image was scaled using a bi-septimal tensor product B-spline as the interpolant Two line caches with hash function indexing were applied, and the partial results were stored in fixed point 8-bit precision.

In the example of FIG. 7d, the CPU time for lookup table generation is 0.04 seconds while the memory used for lookup tables is 32 KB. The CPU time for output generation in the example of FIG. 7d is 37.1 seconds. By contrast the CPU time for image scaling by pixel replication, as shown in FIG. 7b, is 7.4 seconds. The CPU time for image scaling by bi-linear interpolation, as shown in FIG. 7c, is 16.2 seconds.

The time necessary to generate the lookup table is insignificant relative to the total computational time. The bi-septimal interpolation takes slightly more than twice as much as the Yen bilinear interpolation. However, the final image quality produced by the invention is improved in comparison to that of the Yen bilinear interpolation scaling, and significantly superior to the image scaled by pixel replication.

Although the invention is described herein with reference to the preferred embodiment, one skilled in the art will readily appreciate that other applications may be substituted for those set forth herein without departing from the spirit and scope of the present invention.

The embodiments of the invention can include any or all of the indexing scheme, the double buffer, and the line cache. The size of the line cache varies according to the convolution kernel. While in a preferred embodiment of the invention, the input image data is binary data, with each line coded with one bit per pixel, the invention may also be applied to other types of data coded with more than one bit per pixel, including two-bit four-bit and eight-bit grey scale.

The input pixels, the weight tables, and the partial result lookup tables may be stored on the same, or on different devices, including a desktop computer, server, or printer. In a preferred embodiment of the invention, the partial results are stored in a programmable memory, such as PROM or EPROM.

Alternatively, partial results are stored in lookup tables in RAM (Random Access Memory). In this embodiment, the final results are calculated during the image scaling process. Table entries may be calculated in floating point precision but stored in any type of fixed point, such as 8-bit, 16-bit or 32 bit precision. In yet another embodiment, the input pixels, convolution kernels, and partial result lookup tables are stored on a magnetic storage device.

Partial result lookup tables can be pre-calculated for certain specific scaling factors. These lookup tables may then be compressed and stored in ROM (Read Only Memory) and decompressed at run time. For example, partial lookup tables may be provided for letter-size to poster-size scaling, 3×3 to 4×4 scaling.

Additionally, the convolution step can be implemented in ASIC (Application Specific Integrated Circuits) hardware or parallel architectures. For example, a parallel architecture implementation can be achieved by following the design philosophy set forth in J. Fisher, P. Faraboschi and G. Desoli, "Custom Fit Processors: Letting Applications Define Architectures," HP Laboratories Technical Report HPL-96-144, October, 1996.

While the invention is discussed above for use with large scaling factors with high degree interpolants, the scaling algorithm of the invention also has a general application. The invention is also applicable to smaller scaling factors and lower degree interpolants.

One skilled in the art will readily appreciate that the invention may be applied to higher dimensional convolutions. In this case, the techniques described above are implemented using weight functions corresponding to, for example, three-dimensional image processing.

The invention may be implemented as a part of a computer processing unit. Alternatively, the invention may be implemented as a part of the processor unit of a printer. Accordingly, the invention should only be limited by the claims included below.

We claim:

1. A method for reducing the complexity of a two-dimensional linear convolution during image processing, comprising the steps of:
    generating a partial convolution result for a combination of pixels in a row of a pixel array;
    storing the partial result in a lookup table;
    mapping a row of pixels in an input pixel window to the row of the pixel array; and
    accessing the lookup table partial result associated with a matching row.

2. The method of claim 1, in which the mapping step further comprises the steps of:
    deriving a first value from the combination of pixels in the row of the pixel array;
    correlating the first value from the combination of pixels to its associated partial result in the lookup table;
    deriving a second value from a row of pixels in an input pixel window; and
    accessing the lookup table partial result associated with a first value equal to the second value.

3. The method of claim 2, in which a value is derived by the steps of:
    receiving as input bits from a row of pixels; and
    translating the bits into a decimal equivalent.

4. The method of claim 1, further comprising the steps of:
    storing first and second input pixel windows in first and second buffers, respectively;
    processing the contents of the first buffer;
    shifting the contents of the first and second buffers by one pixel at the conclusion of each processing step; and
    storing a third input pixel window in the second buffer when all of the contents in the second buffer are shifted into the first buffer.

5. The method of claim 1, further comprising the step of summing the partial results to generate a grey-scale pixel.

6. The method of claim, 5, further comprising the step of performing a thresholding step upon the grey-scale output pixel to generate an output pixel.

7. The method of claim 1, in which the convolution is derived from a weight function.

8. The method of claim 1, in which in the step of generating a partial result, all possible patterns of a pixel row are multiplied by a corresponding row of a convolution kernel matrix for storage in the lookup table.

9. The method of claim 1, in which the partial result lookup table is pre-calculated for a specific scaling factor.

10. The method of claim 1, in which the partial result lookup table is generated as necessary during a scaling operation.

11. The method of claim 1, in which the lookup table is compressed and stored in ROM and decompressed at run time.

12. The method of claim 1, in which the partial convolution result is calculated in floating point arithmetic and converted to a fixed point precision before being stored in the lookup table.

13. The method of claim 1, in which the partial results are stored in one of a programmable memory, RAM, or a magnetic storage device.

14. A method for reducing the complexity of a two-dimensional linear convolution during image processing, comprising the steps of:
    generating a partial convolution result for a combination of pixels in a row of a pixel array;
    storing the partial result in a lookup table;
    deriving a first value from the combination of pixels in the row of the pixel array;
    correlating the first value from the combination of pixels to its associated partial result in the lookup table;
    storing first and second input pixel windows in first and second buffers, respectively;
    processing the contents of the first buffer;
    sequentially shifting the input pixels of the first and second buffers by one pixel at the conclusion of each processing step;
    sequentially deriving a second value from the row of pixels in an input pixel window;
    accessing the lookup table partial result associated with a first value matching the second value; and
    storing a third input pixel window in the second buffer when all of the input pixels in the second buffer are shifted into the first buffer.

15. The method of claim 14, further comprising the step of summing the partial results to generate a grey-scale pixel.

16. The method of claim 15, further comprising the step of performing a thresholding step upon the grey-scale pixel to generate an output pixel.

17. The method of claim 14, in which a value is derived by the steps of:
    receiving as input bits from a row of pixels; and
    translating the bits into a decimal equivalent.

18. A system for reducing the complexity of a two-dimensional linear convolution, comprising:
    means for generating a partial convolution result for a combination of pixels in a row of a pixel array;
    a lookup table for storing the partial result;
    means for mapping a row of pixels in an input pixel window to the row of the pixel array; and
    means for accessing the lookup table partial result associated with a matching row.

19. The system of claim 18, further comprising:
    means for deriving a first value from the combination of pixels in the row of the pixel array;
    means for correlating the first value from the combination of pixels to its associated partial result in the lookup table;
    means for deriving a second value from a row of pixels in an input pixel window; and
    means for accessing the lookup table partial result associated with a first value equal to the second value.

20. The system of claim 18, further comprising:
    a double buffer having first and second buffers for storing first and second input pixel windows, respectively;
    means for processing the contents of the first buffer;
    means for shifting the input pixels of the first and second buffers by one pixel at the conclusion of each processing step; and means for storing a third input pixel window in the second buffer when all of the contents of the second buffer are shifted into the first buffer.

21. The system of claim 18, further comprising the step of summing the partial results to generate a grey-scale pixel.

22. The system of claim 21, further comprising means for performing a thresholding step upon the grey-scale pixel to generate an output pixel.

* * * * *